No. 872,795. PATENTED DEC. 3, 1907.
R. BURGER.
DOUBLE WALLED VESSEL WITH A SPACE FOR A VACUUM
BETWEEN THE WALLS.
APPLICATION FILED OCT. 23, 1906.

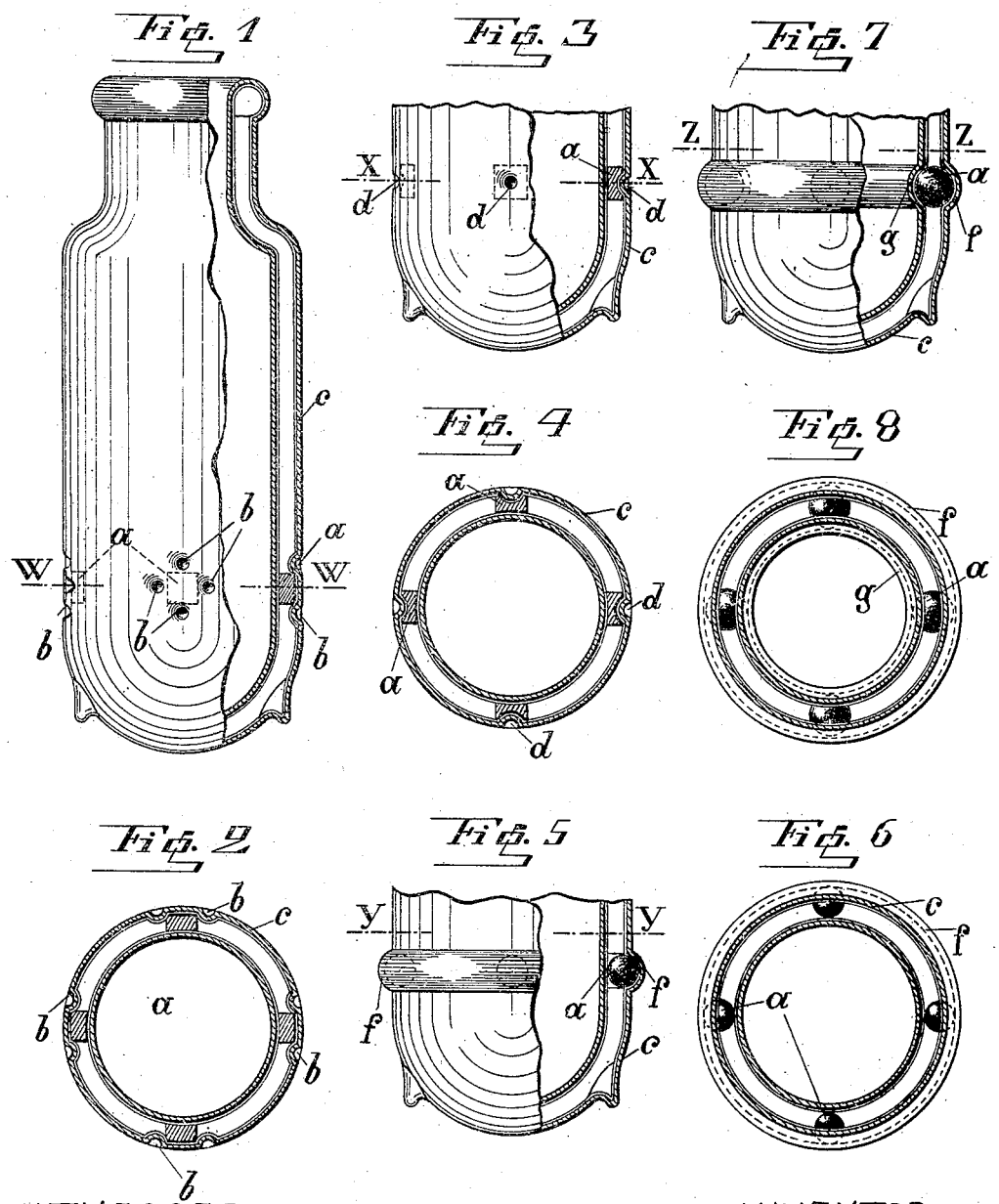

2 SHEETS—SHEET 2.

WITNESSES:
W. H. Berrigan
George J. Schainlauk

INVENTOR,
REINHOLD BURGER,
BY F. Van Drummel
Attorney.

UNITED STATES PATENT OFFICE.

REINHOLD BURGER, OF BERLIN, GERMANY, ASSIGNOR, BY MESNE ASSIGNMENTS, TO AMERICAN THERMOS BOTTLE COMPANY, OF NEW YORK, N. Y., A CORPORATION OF MAINE.

DOUBLE-WALLED VESSEL WITH A SPACE FOR A VACUUM BETWEEN THE WALLS.

No. 872,795.      Specification of Letters Patent.      Patented Dec. 3, 1907.

Application filed October 23, 1906. Serial No. 340,140.

*To all whom it may concern:*

Be it known that I, REINHOLD BURGER, a subject of the German Emperor, and a resident of Berlin, in the German Empire, have invented certain new and useful Improvements in Double-Walled Vessels with a Space for Vacuum Between the Walls, of which the following is a full, clear, and exact description.

The object of my present invention is to provide a double walled vessel of the kind specified, and to provide strengthening or stiffening material within the space between said walls.

In the form preferred by me, the strengthening or stiffening material consists of a plurality of independent elastic stiffeners held in position between the walls by means of unevennesses or projections within the rarefied space between the inner and outer walls of the vessel.

I am aware that it has been heretofore proposed to insert stiffening or strengthening material between the walls of a double walled vessel of the kind mentioned, and such strengthening or stiffening bodies have injuriously acted upon the metal coating of said vessels; it has been difficult and troublesome to attach such bodies and secure them in desired position, and the suspending means employed such as wires and the like have greatly impaired the vacuum. According to my present invention, however, the stiffening or strengthening bodies (preferably of slightly elastic material, such as asbestos, board, cork, and the like poor conductors of heat) are held in position by projections or recesses provided in one or both of the walls of said vessels, whereby the stiffeners are prevented from shifting and are held in place without the employment of wires or other suspending devices introduced into the space between the walls.

The accompanying drawings show various forms of attachments in accordance with this invention.

Figure 9:
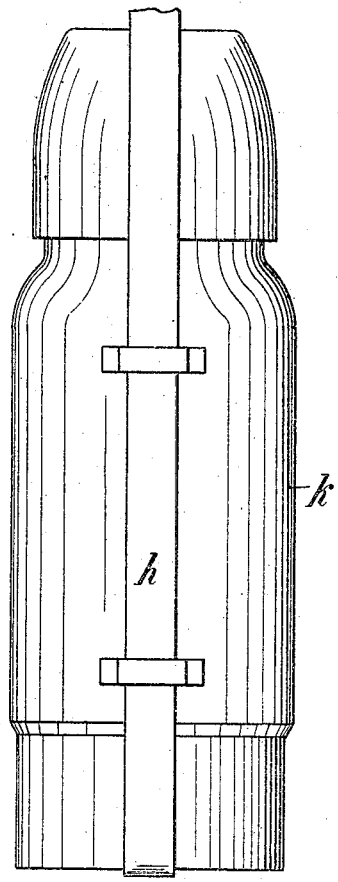
Figure 10:
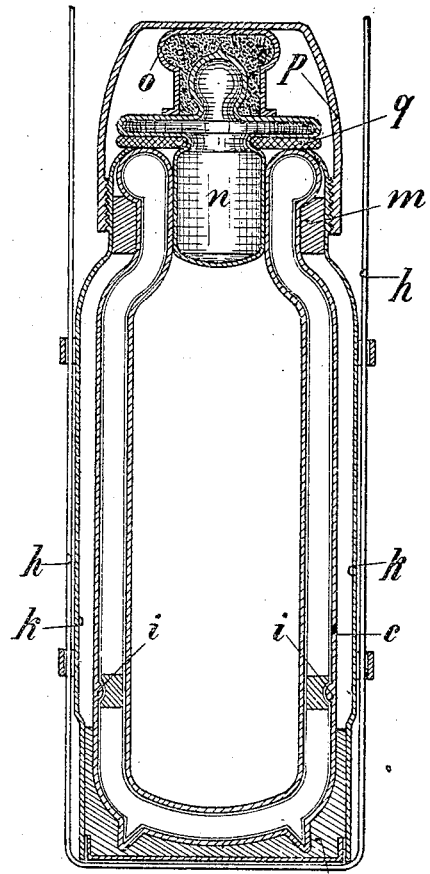
Figure 11:
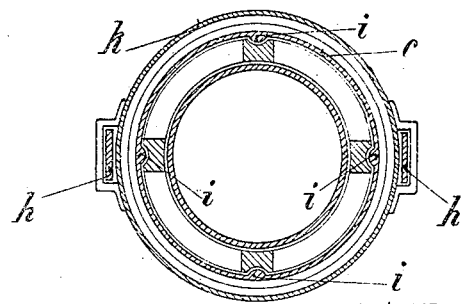

Figure 1 is a view, partly in elevation and partly in section, of one embodiment of my invention, and Fig. 2 is a section thereof on the line W—W; Fig. 3 is a partly sectional view of the lower part of a vessel also embodying my invention, and Fig. 4 is a section thereof on the line X—X; Fig. 5 illustrates another embodiment of my invention; and Fig. 6 is a section thereof on the line Y—Y; Fig. 7 illustrates still another embodiment of my invention, and Fig. 8 is a view on the line Z—Z; Fig. 9 is a view, in elevation, of a field-flask in which a vessel according to Figs. 3 and 4 is used; and Figs. 10 and 11 are views, respectively on longitudinal and cross sections, of Fig. 9.

The vessel shown in Figs. 1 and 2 is double walled and has a convex bottom and a constricted neck but it may be of other desired shape. Between the two walls inclosing the space for the vacuum are the aforesaid stiffening bodies $a$, held in position by depressions $b$ in the outer wall, forming internal projections arranged in groups around each of the said stiffening bodies $a$, which are thereby retained in position.

In the arrangement of Fig. 3, stiffening bodies are held in place by depressions $d$ in the outer wall forming internal projections which engage in the stiffening bodies $a$. In Figs. 5 and 6, the stiffening bodies $a$ are of spherical form and are separated from one another by webs (not shown in the drawing) and are held in position in an annular recess $f$ formed in one of the walls of the vessel (the outer wall $c$ as illustrated).

Referring to Figs. 7 and 8, the stiffening bodies $a$, separated as aforesaid, by webs, are held in position not only by an annular recess $f$ in the outer wall but also by another annular recess $g$ in the inner wall opposite to that in the outer wall.

Figs. 9, 10 and 11 show a field-flask in which a vessel as hereinbefore described is used. In the arrangement shown in these figures the stiffening bodies are held in position and prevented from shifting by button-like projections $i$, formed on the inside of the outer wall and entering the said stiffening bodies. The double wall vessel is inclosed in a casing $k$ of any suitable material such as sheet metal, or leather, provided with a carrying belt $h$, the vessel resting at its lower end on a bed of elastic material $l$ in the casing $k$ and being surrounded, at the neck, by an elastic ring $m$. A hollow glass stopper $n$ (the upper half of which is inclosed in bad conductor of heat contained in a cap $o$) is pressed down by means of a cap $p$, screwed on to the upper part of the casing $k$, which cap may be used as a drinking cup. The stopper is provided with a washer of elastic material which presses on the edge of the mouth of the vessel, and insures an air-tight closure thereof.

Having now particularly described and ascertained the nature of my said invention and in what manner the same is to be performed I declare that what I claim is:

1. A vessel, comprising in combination, double walls of glass united with each other only at the mouth of said vessel and inclosing between them a rarefied space, an unevenness on the surface of one of said walls within said space, and a stiffening body disposed between said walls and engaging and kept in position by said unevenness, substantially as and for the purpose set forth.

2. A vessel, comprising in combination, double walls of glass united with each other only at the mouth of said vessel and inclosing between them a rarefied space, unevennesses provided on the adjacent surfaces of said walls at about the same height within said space, and stiffening bodies disposed between said walls and engaging the unevennesses referred to and kept in position thereby, substantially as set forth.

3. A vessel, comprising in combination, double walls of glass united with each other only at the mouth of said vessel and inclosing between them a rarefied space, a projection on the surface of one of said walls within said space, and a stiffening body disposed between said walls and engaging and kept in position by said projection, substantially as set forth.

4. A vessel, comprising in combination, double walls of glass united with each other at the mouth of said vessel and inclosing a rarefied space between them, and projections on the surfaces of said walls at about the same height within said space, and separate stiffening bodies disposed between said walls and each engaging and kept in position by a projection, substantially as set forth.

In witness whereof I have hereunto signed my name this tenth day of October 1906, in the presence of two subscribing witnesses.

REINHOLD BURGER.

Witnesses:
   WOLDEMAR HAUPT,
   HENRY HASPER.